Figure 1:
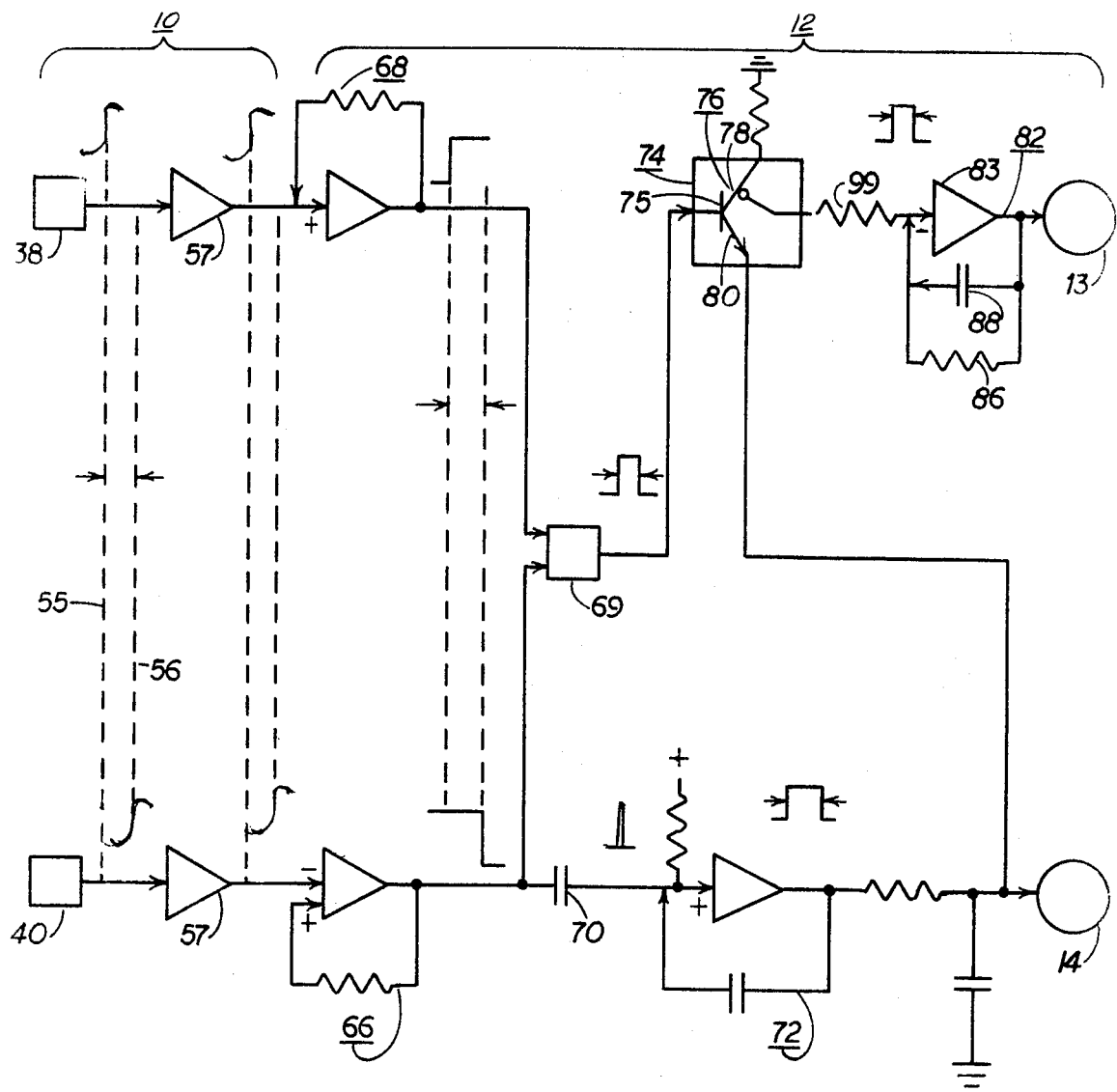

United States Patent [19]
Hagen

[11] 3,762,217
[45] Oct. 2, 1973

[54] TRANSMISSION DYNAMOMETER

[76] Inventor: Glenn E. Hagen, 13342 Dwyer Blvd., New Orleans, La. 70129

[22] Filed: Mar. 29, 1971

[21] Appl. No.: 129,081

[52] U.S. Cl. .............................................. 73/136 A
[51] Int. Cl. .............................................. G01l 3/12
[58] Field of Search .............................. 73/136 A

[56] References Cited
UNITED STATES PATENTS

| | | | |
|---|---|---|---|
| 2,640,352 | 6/1953 | Ellison et al. | 73/136 A |
| 2,949,029 | 8/1960 | Bayles et al. | 73/136 A |
| 3,545,265 | 12/1970 | McIlraith et al. | 73/136 A |
| 3,589,178 | 6/1971 | Germann | 73/136 A |
| 3,604,255 | 9/1971 | Bart | 73/136 A |
| 3,640,131 | 2/1972 | Turk | 73/136 A |
| 2,586,540 | 2/1952 | Holden | 73/136 A |
| 3,625,055 | 12/1971 | LaFourcade | 73/136 A |

FOREIGN PATENTS OR APPLICATIONS

| | | | |
|---|---|---|---|
| 417,051 | 9/1934 | Great Britain | 73/136 A |

Primary Examiner—Charles A. Ruehl
Attorney—James B. Lake, Jr.

[57] ABSTRACT

The optical sensing of twist or torque and speed in a loaded rotating shaft through the physical displacement of a pair of index marks fixed thereon, said marks being longitudinally spaced apart and in line when the shaft is not loaded. Photo cells convert the optical sensing to pairs of electrical signal pulses, the time intervals between the pulses being proportional to the torque and the number of pairs per unit of time being the speed of rotation of the shaft. The signal pulses are combined in a computer to obtain square wave-form signal pulses that are proportional in length to torque, in height to the speed of rotation, and in area to horsepower. These signal pulses are used to generate voltages proportional to the physical characteristics noted and the voltages are fed into voltmeters respectively calibrated in the proper units for the characteristic for reading off the respective values directly in said units.

6 Claims, 5 Drawing Figures

TRANSMISSION DYNAMOMETER

The invention relates generally to dynamometers and more particularly to apparatus installable on and adjacent to any drive shaft for measuring horsepower being delivered by the rotating shaft and the speed of rotation of the shaft for readout display.

Heretofore dynamometers have required the precise engraving of a plurality of index and reference marks around the circumference of a drive shaft, or teeth on the periphery of wheels spaced apart on a drive shaft, and they read only in terms of torque.

It is an object of the invention to provide an improved dynamometer that requires only two index marks to be affixed to a drive shaft in alignment that is correctable with one adjustment while the shaft is rotating.

Another object of the invention is to provide a simple computer for converting torque and speed of rotation data into horsepower readouts.

Another object of the invention is to provide apparatus that can be used without disassembly of a drive shaft from its power source.

Another object of the invention is to provide an improved method of ascertaining horsepower being delivered by a drive shaft and displaying it conveniently.

Figure 2:
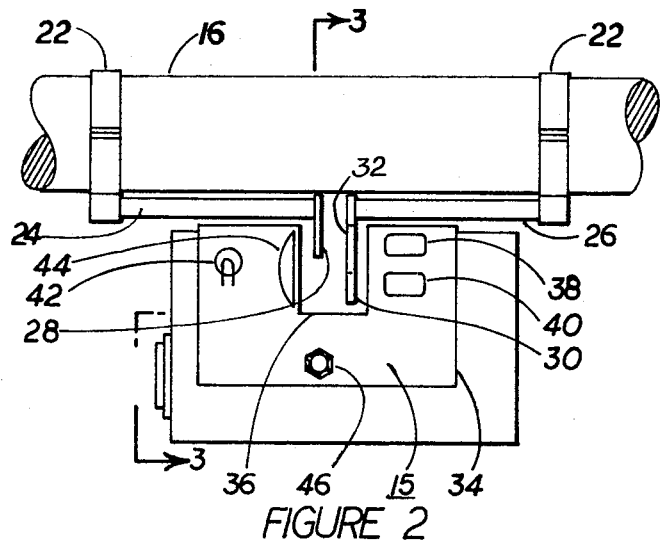
Figure 3:
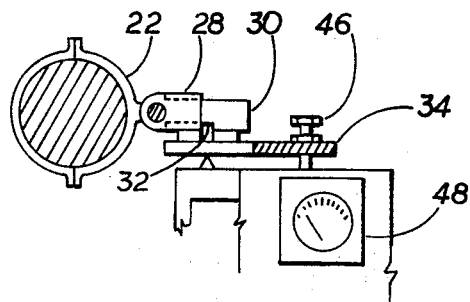
Figure 4:
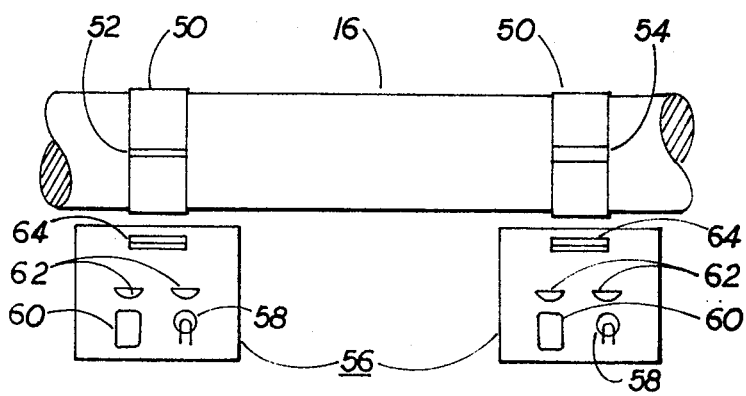
Figure 5:
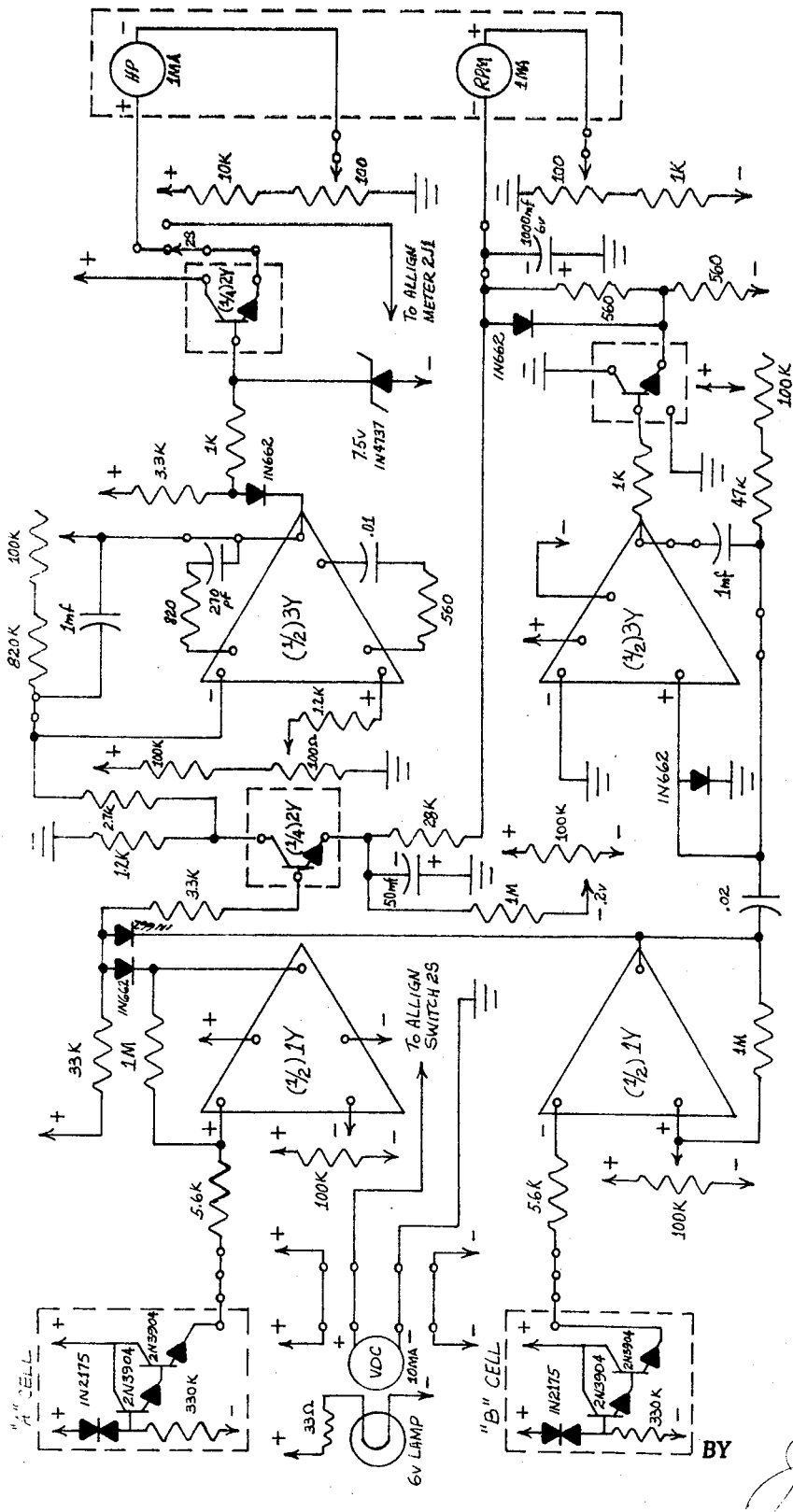

Other objects and a more complete understanding of the invention may be had by referring to the following specifications, claims and drawings, in which:

FIG. 1 is a schematic diagram in block form showing the components and arrangement of the invention, FIG. 2 is a plan view of a specie of sensing apparatus diagrammatically presented as mounted for operation with a drive shaft, FIG. 3 is a sectional view along section line 3—3 of FIG. 2, FIG. 4 is a plan view similar to FIG. 2, but showing a second specie of sensing apparatus, and FIG. 5 is a schematic diagram of an electrical circuit for practicing the invention.

Referring to FIGS. 1 and 2, the invention comprises three major components; the sensing apparatus 10, the computer 12, and the display indicators 13 and 14. A sensing station 15 is located adjacent a drive shaft 16 and the sensing apparatus is located on the shaft 16 and at the station. The computer can be located at any convenient place, but wiring can be minimized and also the amplification, if the computer is located near the sensing station. The display indicators may be mounted nearby or remotely as on a control bridge of a ship. A source of electrical power (not shown) is required, and the invention can be designed to work off of any available voltage of either alternating or direct current.

Referring to FIGS. 2 and 4, there are two species of sensing apparatus which will be referred to as the "flag" specie (FIG. 2) and as the "reflector" specie (FIG. 4). In both species the torque on the shaft 16 is sensed by measuring the amount of twist in the shaft, between index marks, due to torque. In both species, the two index marks are mounted and spaced longitudinally apart along the shaft when it is idle. Any rotation of one of the marks with respect to the other is measured. In both species, a signal in the form of an electrical pulse is produced once per revolution of the shaft from each of the two index marks. When the shaft is placed under torque, the twist causes one of the above signals to be delayed with respect to the other. The computer 12 measures the delay between signals and makes the necessary computations to derive the speed of rotation (rpms), torque and horsepower, presenting these as a dc voltage which is fed into display indicators 13 and 14.

In the flag specie, (FIGS. 2 and 3) two clamps 22 are placed on the shaft 16 and spaced thereon a convenient distance apart. Pointers 24 and 26 are respectively affixed, in alignment, to the clamps so that the flags 28 and 30, angularly integral with the respectively adjacent and opposing ends of the pointers, are also aligned. When the shaft is under torque, one of the clamps will be slightly rotated with respect to the other and this will cause the flags to move out of alignment. These flags 28 and 30 are unequal in size and shape, flag 28 being shorter than flag 30, and the trailing edge 32 of flag 30 being cut away adjacent the shorter flag 28. A sensing head 34, having a notch 36, is fixed adjacent to the flags and adapted for the flags to pass through the notch 36. On one side of said notch is mounted two photo cells 38 and 40 which are adapted to receive light from a lamp 42 mounted behind a lens 44 on the other side of said notch. When the flags pass through the notch 36, the shorter flag 28 breaks breaks the light from lamp 42 to photo cell 38 and the flag 30 breaks the light to both photo cells 38 and 40. However as the trailing edge of flag 30 is cut away, the reestablishment of light to the photo cell 38 is controlled by flag 28. The photo cells give a pulse signal at the time the light from the lamp reappears on the respective cells. Thus photo cell 38 will pulse when the trailing edge of flag 28 goes by, and photo cell 40 will pulse when the trailing edge of flag 30 goes by. When the shaft 16 is under torque, the twist causes flag 30 to lag behind flag 28 and thus produce a time delay between the two signals of the same revolution of the shaft.

The single lamp 42 illuminates both photo cells and eliminates any differences of brilliance because both cells will be equally affected so that a dim lamp will delay both signals and leave the intervals to be measured unchanged. The lens 44 is included to make the light beams from the lamp 42 parallel to the axis of the shaft 16. Any end play in the shaft will not change the measured time interval under this arrangement.

It is important for the flags 28 and 30 to be initially aligned so that the time delay is zero when the torque on the shaft is zero. Referring to FIG. 3, the final adjustment of the alignment is done by means of an adjustment screw 46 on the fixed sensing head 34. Screw 46 tilts the head 34 on an axis parallel with that of the shaft 16 and cause one of the cells to be moved slightly with respect to the other in the direction of rotation of the flags. This slight displacement will compensate for the slight accidental misalignment of the flags. The method of alignment is to arrange for the shaft to be rotating with no torque on it. In the case of a ship this can normally be done by getting the ship under way and then disengaging the engine clutch, so that for a few minutes the shaft is wind-milling from the momentum of the boat and propeller. During this time the adjustment screw 46 can be turned until signals from cells 38 and 40 are simultaneous, as evidenced by a zero reading on meter 48 connected as later described to computer element 12. In the case of direct drive diesel ships where there is no clutch and the engines are stopped and started backward for reversing just as in reciprocating steam engines, the procedure is to find a zero setting for the screw when at idle speed forward and for idle speed in reverse. Then the screw 46 is brought to a setting half way between the respective settings.

Referring to FIG. 4, in the reflector specie of sensing apparatus two black bands 50 are painted on the shaft 16 and two strips 52 and 54 of reflective tape are respectively aligned thereon. The tape is an engineering grade that sends a large percentage of reflected light toward the source of light rather than scattering it and is similar to that used on the rear bumpers of vehicles. Two separate sensing heads 56 are used, each having a lamp 58 and an associated photo cell 60. A lens 62 is mounted in front of each lamp and photo cell and respectively serve to collimate the light from the lamp and to collect the returning light and focus it on the cell. Another lens 64 which is cylindrical is mounted in front of lens 62 for focusing the light into a thin line where it strikes shaft 16. Using a line rather than a spot of light gives a large response when the edge of the tape comes into the range of the light, but gives very little response to specks of dust or other spurious reflections. Final alignment of the reflector specie sensing apparatus is accomplished by raising or lowering one of the sensing heads 56 with respect to the other in order to advance or retard its signal to coincide with the other.

A preferred type of photo cell is a photo diode such as the 1N2175. These have an inherent rise time of around two microseconds, which is satisfactory for the purpose of the invention. The fall time, that is the length of time it takes for conductivity to subside after light has disappeared, is much longer. Therefore, the signal used is the rise time due to increase in light that will occur on the leading edge of the tape in the reflector specie, or the trailing edge of the flag in the flag specie.

Photo diodes are high impedance devices and any exposed wiring from or to it would be sensitive to dirt, moisture, oil spray and stray pickup from adjacent circuitry. To prevent this the cells are potted in a block of plastic along with a two transistor current amplifier 57 (Darlington emitter follower pair, FIGS. 1, 5) so that no moisture can reach the cell circuit, and the impedance, after the amplifier, has dropped to about 1,000 ohms is low enough not to be very sensitive to moisture, leakage and stray pickup. The amplified low-impedance signals are fed through a multi-wire cable to the computer 12.

The signals reach the computer 12 in the form of a sharp rise in voltage. The signal from cell 40 will be delayed with respect to the signal from cell 38 a time delay directly proportional to the shaft torque as indicated by the twist displacement of the flags (or tapes). The pulse length omitting constant factors will be $t = T/S$, where t is the duration of the time delay, T is the torque on the shaft, and S is the speed of the shaft in rpm. In the computer the signals are respectively fed into Schmitt trigger circuits 66 and 68 (see FIGS. 1 and 5). A preferred trigger circuit is an integrated-circuit dual operational amplifier such as a Motorola MC-1435-G with about one megohm of positive feedback. The purpose of the Schmitt circuits are to "square up" the signals. Regardless of how slow the rise of a cell output, the Schmitt circuits trigger at a certain point and swing sharply to produce a square output form.

The amplified signal from cell 40 is fed into the inverting input of the operational amplifier of Schmitt circuit 66 in order to obtain in inverted output form. The amplified signal from cell 38 is fed into the non-inverting input of the operational amplifier of Schmitt circuit 68 in order to obtain a rising non-inverted output form. T/S earlier than the inverted form. The rising and falling square waves are coupled to an "and" gate 69 that combines the pulses into one square pulse just T/S in length. It should be noted that the final pulse occurs only during the interval where the Schmitt circuit 68 has risen and the Schmitt circuit 66 is still high. Care must be taken not to have the same conditions occur at the leading edges of the flags or the trailing edges of the tapes. This is prevented by having the tape 54 wider than the tape 52, or the flag 30 narrower than the flag 28 (see FIGS. 2 and 4).

The Schmitt circuit output is also fed through a differentiating capacitor 70 to yield a sharp spike at the fall of said output; this marks off each revolution and is the input to the tachometer or rpm circuit and rpm indicator 14. The sharp spike is fed as a triggering pulse to a mono-stable multivibrator 72, also known as a 'one-shot', which is a circuit which produces an output pulse of a constant duration "k" each time it is triggered. A preferred one-shot comprises half of an integrated circuit dual operational amplifier 71 such as a Motorola MC-1437-L with a resistor-capacitor positive feed back (see FIGS. 1 and 5) where the time constant of the resistor-capacitor combination controls the pulse length 'K'.

The one-shot delivers a pulse every revolution, Averaging these pulses yields a dc voltage directly proportional to the speed S (rpm) of the shaft. The average will be the height of the pulses, E a constant, times the ratio of the length of the pulses, K, to time taken for a complete revolution, which will be A/S where A is some constant and S is shaft speed in rpm. Thus: Average dc voltage $= E(K/A/S) = EKS/A$. The constants E and K can be chosen so the meter 14 reads directly in shaft rpm.

Returning to the "and" gate the square pulse output therefrom which is T/S in duration (T is Torque, and S is speed) is fed to a modulator 74, that is to the base 75 of a transistor 76 causing it to be conducting during the pulse but otherwise cut off. A preferred transistor is one-fourth of an integrated circuit array such as an RCA CA-3018. When the transistor 76 is cut off, its collector 78 rests at ground potential. When it conducts, which is for the interval of the T/S pulse, the collector 78 drops to approximately the same potential as the emitter 80, which is connected to the tachometer output, and is negative voltage proportional to rpm S. Thus the negative output pulse at the collector 78 of the transistor is T/S in length and S in height. The area of this pulse will be the product of length times height, or $T/S \times S = T$. Pulse area is then directly proportional to the torque on the shaft. The pulses are fed to an analogue integrator 82. A preferred integrator is one-half of an integrated circuit operational amplifier 83 such as the Motorola MC-1437-L with resistor 86 and capacitor 88 negative feedback. The dc output of the integrator 82 will be the pulse area per unit of time; that is Integrator output $= (T \times B)/1/S$ which equals BTS or horsepower, where B is a constant depending on the ratio or resistor 86 to resistor 90 and can be chosen so that the indicator 13 reads directly in horsepower.

An alternate version of the device indicates torque on the output meter 13 rather than horsepower. This uses the same integrator circuit but instead of the emitter 80 of the modulator 74 going to rpm volts it is placed at a constant voltage; this feeds the integrator with pulses of T/S duration, constant height times frequency of arrival S to give an integrated result torque T.

In FIG. 5 which is a schematic diagram of operating circuits of the invention, the sensing circuit for the leading signal pulses is designated "A" Cell and the sensing circuit for the following signal pulses is designated "B" Cell. The dotted lines around the respective cells indicates the electronic parts indicated therein are "potted" that is enclosed in plastic and comprise part of sensing station 10. The electronic values of the constituent parts or their designations are indicated adjacent the parts. The open triangular areas are operational amplifiers and are designated as parts of 1Y which is Motorola MC 1435 G Dual Operational Amplifier, and 3Y which is Motorola MC 1437L Dual Operational Amplifier. RCA CA3018 is a 4-Transitor Array. The dashed lines enclosing the volt meters designated HP and RPM indicates the display indicators 13 and 14. The circuits between the indicators and the A and B cells are designated as the computer 12. It is believed that any possible omission in the rest of the disclosure will be supplied by the schematic.

What is claimed is:

1. An improved dynamometer for measuring horsepower, torque and speed of rotation of a driven shaft comprising: a pair of index mark means, longitudinally spaced apart and in line when fixed on said driven shaft when unloaded; a first sensing head comprising a base defining a notch in an edge, said base being mounted adjacent said index mark means and adapted for said means to rotate through said notch; a pair of photo-electric cells mounted on one side of said notch in the base, and a lamp mounted on the other side of said notch and in line with said cells, and a lens mounted therebetween on said base adjacent said lamp, said index mark means being adapted to pass between said lamp and lens on one said of said notch and said cells on the other side to generate leading and following electrical signal pulses for each turn of said shaft, the difference between each leading and following signal pulses being a measure of torque, and the number of pairs of signal pulses per time constant being a measure of the shaft speed of rotation; and a pair of current amplifiers respectively connected to outputs of said photo-electric cells for strengthening signal pulses and reducing noise; computing means connected to outputs of said amplifiers for combining said outputs to generate voltages respectively proportional to said torque, turns per unit of time, and their product, horsepower; and indicating means, calibrated to read in units of horsepower, torque and turns per unit of time, connected respectively to the voltage outputs of said computer means and respectively responsive thereto to read said voltages in the calibration terms thereof.

2. An improved dynamometer as described in claim 1 wherein said pair of index mark means comprise: a pair of clamps for clamping on said driven shaft, said clamps being spaced longitudinally apart; pointers respectively fixed to each said clamp by respectively oppositely disposed pointer ends, said pointers extending normal to said clamps and toward each other parallel to said driven shaft and offset therefrom; a flag fixed to each of adjacent opposing ends of said pointers, said flags being arranged to have their following edges in line with said driven shaft unloaded, and adapted to move from between the lamp and lens on one side and the photo-electric cells on the other together.

3. An improved dynamometer as described in claim 2 wherein said flags comprise: a short wide flag attached to one of said pointers clamped nearest the driven end of said driven shaft for interrupting and reestablishing light from said lamp and lens to one of said photo-electric cells to generate a leading pulse; a longer and narrower flag attached to the other of said pointers clamped nearest the driving end of said driven shaft for interrupting and reestablishing light from the lamp and lens to the other photo-electric cell that generates a following pulse, the following edge of the longer flag being cut away adjacent the shorter flag for the following edge of said shorter flag to cause its associated photo-electric cell to be always pulsed thereby.

4. An improved dynamometer as described in claim 1 wherein said first sensing head base comprises: Two legs spaced apart and defining an axis parallel with said driven shaft, mounted under said base adjacent the notched edge; a vertically adjustable third leg mounted between said two legs and offset from said notched edge and adapted to tilt said first sensing head on said parallel axis and thereby cause one said photo-electric cell to be moved with respect to the other in the direction of driven shaft rotation to compensate for minor misalignment of the index mark means; and a voltmeter mounted on said base and switchably connected to said computing means and adapted to read zero when the following edges of said flags are set in precise alignment by tilting said first sensing head.

5. An improved dynamometer for measuring horsepower transmitted by a rotating loaded shaft and the rate of rotation of said shaft comprising: a pair of index mark means fixed on said shaft, said mark means being longitudinally spaced apart and in line when said shaft is unloaded; photo-electric sensing means mounted stationarily adjacent each mark means and adapted to generate a pair of electrical signal pulses having rounded half wave forms, one for each mark means, for each revolution of said pairs of mark means on said shaft, whereby a time interval between a leading and a following signal pulse of each said pair is a measure of and proportional to any twist or torque on said rotating shaft between said index mark means, and the number of said pairs of signals per unit of time is a measure of the speed of rotation of said shaft; a pair of first operational amplifier means having positive feedbacks and positive and negative input terminals for non-inverting and inverting inputs, said amplifier means being adapted to square the rounded half wave forms of said electrical signal pulses and invert the following signal pulses of each pair of signal pulses; an "and" gate means connected to both the half square wave outputs of said first operational amplifier means, said gate for combining each pair of square half waves into a full square wave form signal pulses, each having a length proportional to said twist or torque on said rotating shaft; generating means connected also to the inverted square wave form output for generating uniform full square waves at a frequency equal to the number of revolutions of said shaft per time constant; filter circuit means connected to the output of said generating means for averaging said uniform pulses and generating a voltage proportional to said pulse frequency; a first voltmeter calibrated in revolutions per constant unit of time connected to said output voltage of the filter circuit means for reading said voltage in terms of shaft revolutions per constant unit of time; a modulator connected to modulate the output of said "and" gate means with the output voltage of said filter circuit means for generating electrical signal pulses having full square wave forms with lengths proportional to said twist or torque heights proportional to revolutions per constant units of time, and areas proportional to horsepower; integrator circuit means connected to the output of said modulator for generating a voltage proportional to said wave areas; and a second voltmeter calibrated in horsepower and connected to said voltage output of said integrator circuit means for directly reading said voltage in terms of horsepower transmitted by said rotating shaft.

6. An improved method of measuring horsepower and torque delivered by a shaft and the revolutions per minute said shaft is turning comprising the steps: fixing a pair of index marks, longitudinally spaced apart and in line, on an unloaded shaft; loading and rotating said shaft; optically sensing the relative physical displacement of one said mark with respect to the other said mark because of said loaded rotation of said shaft, one said mark lagging behind the other in the direction of rotation, said marks being termed respectively the following mark and the leading mark; generating photoelectrically a signal pulse having a half wave form for each revolution of said shaft and each of said marks fixed thereon, the time interval between leading and following pulses respectively caused by said leading and following marks per revolution being a measure of the torque on the shaft, and repetition of pairs of pulses per minute being the speed of rotation of said shaft; amplifying said generated pulses in respective current amplifiers to reduce impedance of long connecting cable; squaring the half wave forms of said signal pulses and inverting the squared half wave form of the following singal pulses in respective "Schmitt" circuits; combining by passing through an "and" gate the squared non-inverted and inverted half wave forms of the leading and following signal pulses respectively into square wave forms, each having a length which is proportional to the torque on the shaft; generating a sharp spike wave form from each inverted wave form of the following pulse signals, that is one for each turn of the shaft; triggering a mono-stable multivibrator with said spiked wave forms to generate square wave signal pulses of constant duration; generating a voltage in a filter circuit with the signal pulses of constant duration, said voltage being proportional to revolutions per minute of said shaft; reading out said revolutions per minute from a voltmeter calibrated in revolution per minute and connected to said voltage; modulating the output of said "and" gate with the voltage proportional to shaft revolutions per minute for generating square wave pulses, each having a length proportional to torque on the shaft and a height proportional to shaft speed of rotation, and therefore an area proportional to horsepower; generating a voltage proportional to the areas of said square wave form signal pulses in a high gain antilog integrating circuit with said signal pulses; reading out said horsepower from a voltmeter calibrated in horsepower units and connected to the voltage output of said integrating circuit.

* * * * *